United States Patent
Soothill et al.

(10) Patent No.: US 8,346,394 B2
(45) Date of Patent: Jan. 1, 2013

(54) POWER PLANT WITH $CO_2$ CAPTURE AND COMPRESSION

(75) Inventors: Charles Soothill, Thalwil (CH); Christian Steinbach, Birmensdorf (CH); Allen Michael Pfeffer, Windsor Locks, CT (US); Philippe Jean-Michel Paelinck, Paris (FR); Jurgen Hoffmann, Untersiggenthal (CH)

(73) Assignee: Alstom Technology Ltd, Baden (CH)

( * ) Notice: Subject to any disclaimer, the term of this patent is extended or adjusted under 35 U.S.C. 154(b) by 74 days.

(21) Appl. No.: 12/833,579

(22) Filed: Jul. 9, 2010

(65) Prior Publication Data

US 2011/0056200 A1     Mar. 10, 2011

Related U.S. Application Data

(63) Continuation of application No. PCT/EP2008/068212, filed on Dec. 23, 2008.

(30) Foreign Application Priority Data

Jan. 11, 2008   (EP) ..................................... 08100388

(51) Int. Cl.
*G05B 13/00* (2006.01)
*B01D 53/34* (2006.01)
*F01K 17/00* (2006.01)

(52) U.S. Cl. ...... 700/274; 700/266; 60/39.53; 60/39.55; 60/685; 60/686; 422/168

(58) Field of Classification Search ......................... None
See application file for complete search history.

(56) References Cited

U.S. PATENT DOCUMENTS

| | | | |
|---|---|---|---|
| 6,196,000 | B1 | 3/2001 | Fassbender |
| 2003/0131582 | A1 | 7/2003 | Anderson et al. |
| 2006/0085363 | A1 | 4/2006 | Cheng et al. |
| 2007/0248527 | A1* | 10/2007 | Spencer ..................... 423/437.1 |

FOREIGN PATENT DOCUMENTS

| | | |
|---|---|---|
| EP | 0537593 A1 | 4/1993 |
| EP | 1688173 A2 | 8/2006 |
| WO | WO 2007/073201 A1 | 6/2007 |
| WO | WO 2008/090167 A1 | 7/2008 |

OTHER PUBLICATIONS

Notification of Transmittal of the International Search Report (Form PCT/ISA/220 and PCT/ISA/210) and the Written Opinion of the International Searching Authority (Form PCT/ISA/237) dated Dec. 20, 2011, issued in the corresponding International Application No. PCT/EP2008/068212.
European Search Report for EP 08100388.1 dated Mar. 24, 2009.
Wendelberger K et al., Betriebsverhalten eines 600-MW-Kohleblockes in Leistungsregelung, VGB Kraftwerkstechnik GMBH. Essen, DE, vol. 80, No. 3, Jan. 1, 2000, pp. 36-39.

* cited by examiner

*Primary Examiner* — Neil N Turk
(74) *Attorney, Agent, or Firm* — Buchanan Ingersoll & Rooney PC

(57) ABSTRACT

Power plant characteristics are operated in a flexible manner by controlling the power consumption of a $CO_2$ capture and compression system. The impact of $CO_2$ capture and compression on the capacity of a power plant can be minimized to maximize the electric power the plant can deliver to the power grid and the impact of $CO_2$ capture and compression on the average plant efficiency can be reduced, by an operating method and a power plant, in which the power consumption of the $CO_2$ capture system is used to control the net output of the plant.

21 Claims, 2 Drawing Sheets

POWER PLANT WITH $CO_2$ CAPTURE AND COMPRESSION

RELATED APPLICATIONS

This application claims priority as a continuation application under 35 U.S.C. §120 to PCT/EP2008/068212 which was filed as an International Application on Dec. 23, 2008 designating the U.S., and which claims priority to European Application 08100388.1 filed in Europe on Jan. 11, 2008. The entire contents of these applications are hereby incorporated by reference in their entireties.

FIELD

The disclosure relates to power plants with $CO_2$ capture and compression as well as their operation.

BACKGROUND INFORMATION

In recent years it has been stated generation of greenhouse gases leads to global warming and that further increase in greenhouse gas production will further accelerate global warming. Since $CO_2$ (carbon dioxide) is identified as a main greenhouse gas, CCS (carbon capture and storage) is considered one potential major way to reduce the release of greenhouse gases into the atmosphere and to control global warming. In this context CCS can be defined as the process of $CO_2$ capture, compression, transport and storage. Capture can be defined as a process in which $CO_2$ is removed either from the flue gases after combustion of a carbon based fuel or the removal of and processing of carbon before combustion. Regeneration of any absorbents, adsorbents or other ways to remove $CO_2$ of carbon from a flue gas or fuel gas flow is considered to be part of the capture process. There are several possible approaches to $CO_2$ capture in power plants. The main technologies under discussion for $CO_2$ capture are so called pre-combustion capture, oxyfiring, chemical looping and post-combustion capture.

Pre-combustion carbon capture involves the removal of all or part of the carbon content of a fuel before burning it. For natural gas, this can be done by reforming it with steam, followed by a shift reaction to produce $CO_2$ and hydrogen. The $CO_2$ can be captured and removed from the resulting gas mixture. The hydrogen can then be used to produce useful energy. The process is also known as synthesis gas or syngas approach. The same approach can be used for coal or any fossil fuel. First the fuel is gasified and then treated in the same way as natural gas. Applications of this approach in combination with IGCC (Integrated Gasification Combined Cycle) can be envisioned.

Oxyfiring (also known as oxyfuel firing or oxygen combustion) is a technology that burns coal or other fossil fuel in a mixture of oxygen and recirculated $CO_2$ rather than air. It produces a flue gas of concentrated $CO_2$ and steam. From this, $CO_2$ can be separated simply by condensing the water vapor, which is the second product of the combustion reaction.

Chemical looping involves the use of a metal oxide as an oxygen carrier, such as a metal oxide, which transfers oxygen from the combustion air to the fuel. Products from combustion are $CO_2$, reduced metal oxide and steam. After condensation of the water vapor, the $CO_2$ stream can be compressed for transportation and storage.

The CCS technology currently considered closest to large-scale industrial application is post combustion capture combined with compression, transportation and storage. In post-combustion capture the $CO_2$ can be removed from a flue gas. The remaining flue gas can be released to the atmosphere and the $CO_2$ can be compressed for transportation and storage. There are several technologies known to remove $CO_2$ from a flue gas such as absorption, adsorption, membrane separation, and cryogenic separation.

Known technologies for $CO_2$ capture and compression can require relatively large amounts of energy. There are many publications on the optimization of the different processes and the reduction of the power and efficiency penalty by integrating these processes into a power plant.

For CCS with post combustion capture, the $CO_2$ capture and the compression of $CO_2$ for further processing, i.e. transport and storage, can be the main two power consumers.

EP1688173 gives an example for post combustion capture and a method for the reduction of power output penalties due to $CO_2$ absorption, respectively the regeneration of the absorption liquid. Here it is proposed to extract steam for regeneration of the absorbent from different stages of the steam turbine of a power plant to minimize a reduction in turbine output.

In the same context, the WO2007/073201 suggests to use the compression heat, which results from compressing the $CO_2$ stream for regeneration of the absorbent.

These methods aim to reduce the power requirements of specific $CO_2$ capture equipments, however the use of the proposed $CO_2$ capturing method can result in a significant reduction of the plant capacity, i.e. the maximum power a plant can deliver to the grid.

An attempt to mitigate the impact of $CO_2$ capture on the plant output is disclosed in the EP0537593, which describes a power plant that utilizes an absorbent for $CO_2$ capture from the flue gases, where the regenerator can be switched off during times of high power demand and where the $CO_2$ capture continues by use of absorbent stored in an absorbent tank during these times. EP0537593 discloses a simple on/off mode of one power consumer of the $CO_2$ capture equipment. It adds little operational flexibility at relatively high cost.

SUMMARY

A method is disclosed for operating a power plant, the method comprising operating the plant via a control system and $CO_2$ capture system; and using power consumption of the $CO_2$ capture system as a control parameter for a net power output of the plant.

A power plant, comprising: a $CO_2$ capture system; and a control system for receiving power consumption of the $CO_2$ capture system as a control parameter for controlling net power output of the plant.

BRIEF DESCRIPTION OF THE DRAWINGS

The disclosure, its nature as well as its advantages, shall be described in more detail below with the aid of the accompanying drawings, wherein.

DETAILED DESCRIPTION

The present disclosure relates to operating methods for power plants with $CO_2$ capture and compression and to power plants with $CO_2$ capture and compression designed to operate according to the operating methods.

The impact of CCS (carbon capture and storage) on the plant performance can be reduced by a flexible operation method of the $CO_2$ capture equipment and compression unit. In particular the impact of $CO_2$ capture and compression on the capacity of a power plant can be minimized, i.e. the electric power the plant can deliver to the power grid can be maximized. Further, the impact of $CO_2$ capture and compression on the average plant efficiency also can be reduced.

In an exemplary plant operating method, the power consumption of the $CO_2$ capture system can be used to control the net output of the plant. In the context of this disclosure, an exemplary $CO_2$ capture system can be defined as the entire $CO_2$ capture unit plus the compression unit with all their auxiliaries. Further, the electrical power consumption, mechanical power consumption, for example, mechanical $CO_2$ compressor drives, as well as consumption of live steam, which otherwise can be converted into electrical energy in a steam turbine, can be considered as power consumption of the capture system. This method can provide additional flexibility in addition to the existing control of the plant. Due to the integration of an exemplary $CO_2$ capture system into the power plant with this method, the thermal load of the plant can be kept constant during extended periods of operation. The plant can be operated at a base load for extended periods of time. Influence of changes in the thermal load due to a change in ambient conditions is neglected in this discussion. Further, an operation close to or at the efficiency optimum of the plant can be realized and the rated capacity of the plant can be significantly increased. Most embodiments of this disclosure can be realized at no or very little additional cost.

The net output of the plant can be changed by an exemplary intermittent operation method of the $CO_2$ capture equipment and compression unit or an exemplary operation method where the $CO_2$ capture equipment and compression unit are operating at reduced capacity.

For control of the power consumption of $CO_2$ capture and compression several approaches are conceivable.

Figure 1:
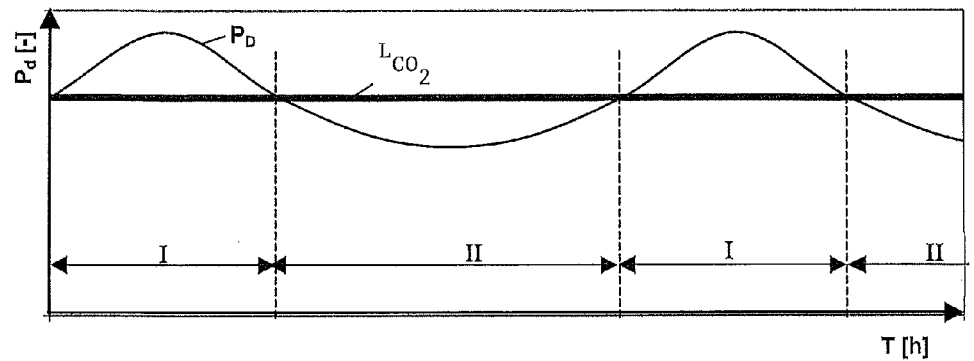
FIG. 1 schematically shows an exemplary embodiment of an operation method for intermittent $CO_2$ capture.

In an exemplary embodiment, the $CO_2$ capture and compression equipment or its main power consumers can be switched off at times of high power demand (see FIG. 1). The $CO_2$ separation, independent of chosen technology, can be stopped and the plant can run like a known plant with $CO_2$ emissions in the flue gases. Correspondingly, no $CO_2$ compression with its parasitic power demand is required.

Operation of $CO_2$ capture and compression can be carried out on a cost optimized and operating permit related bases. Once the price/benefit for $CO_2$ capture and compression is higher than the benefit of additional power production, the $CO_2$ capture and compression comes into operation, and vice versa. Further, the $CO_2$ capture and compression always stays operational as long as regulations and permits require it.

Figure 4:
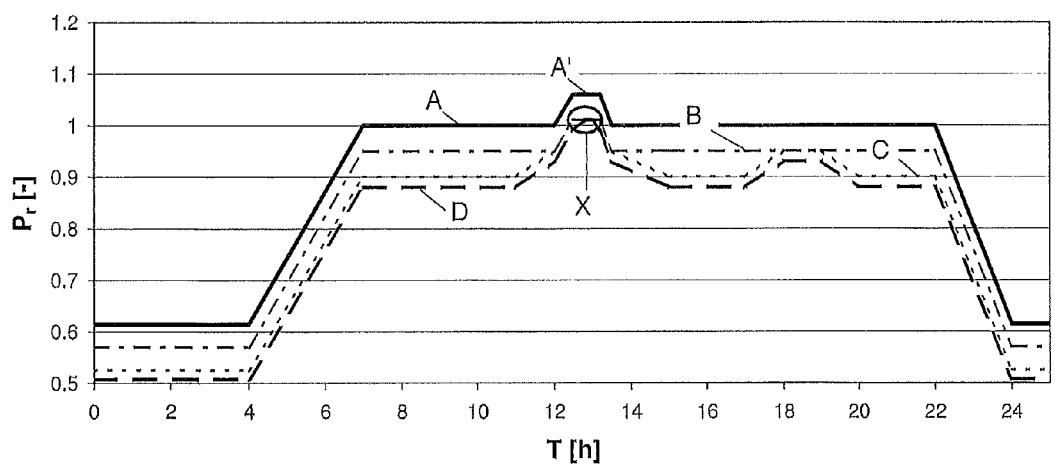
FIG. 4 schematically shows the relative power output $P_r$ variations over time T for an exemplary embodiment of a power plant with a flexible operation method for $CO_2$ capture and compression.

Besides the on/off mode, a derating or part load operation of the $CO_2$ capture equipment and compression can be utilized during times of high power demand. As a consequence the capture rate will normally be reduced during this period. The cost per ton of $CO_2$ captured and compressed is a function of the capture rate, which is the ratio of $CO_2$ captured from the flue gases to the total $CO_2$ produced by the plant. The optimum, or the minimum in cost per ton of $CO_2$ captured and compressed is estimated to be in the region of 70% to 90% capture rate (FIG. 4). It is estimated that there is a sharp increase in costs for capture rates above approximately 90% but that the minimum shows a relatively flat curve to lower capture rates. Therefore operating at capture rates below design will not lead to a significant increase in operating costs. However, the reduction in power consumption for $CO_2$ captures and compression during peak demand will lead to substantial increase in earnings since the price for electric power can increase significantly during peak demand. Flexible operation of the capture equipment and compression unit can also increase the rated capacity and competitiveness of power plants with $CO_2$ capture and compression. It will allow earlier introduction of this kind of plants beyond mere pilot plant projects into a competitive power market.

In the following, an exemplary flexible operation method for $CO_2$ capture and compression is discussed using the example of $CO_2$ absorption. An analogous method can be applicable for a $CO_2$ capture method, which includes $CO_2$ adsorption, regeneration of the adsorbent and compression of captured $CO_2$. Operating concepts using the same principle are conceivable for all $CO_2$ capture methods.

Operation of a $CO_2$ capture and compression process, which includes $CO_2$ absorption, regeneration of the absorbent and compression of captured $CO_2$ gives three main options to increase the flexibility of the plant operation. They can be performed one by one or all at the same time. They are:
  1. Shut down or operation at reduced capacity of $CO_2$ compression unit;
  2. Shut down or operation at reduced capacity of regeneration unit; and
  3. Shut down or operation at reduced capacity of absorption unit.

While the first option already leads to a significant reduction in parasitic power consumption it can lead to a release of $CO_2$ to the atmosphere within a very short time period as large volumes of uncompressed $CO_2$ cannot be stored economically. For a safe disposal of the captured $CO_2$ it can for example be mixed with the flue gases downstream of the $CO_2$ absorption unit and released via the stack of the power plant.

A further significant reduction in parasitic power consumption can be realized by the second option. Regeneration can be done by "re-boiling" of the absorbent, which means heating the absorbent by steam in order to release the $CO_2$. In consequence the steam is no longer available for power production. Once the regeneration is stopped during peak power demand, the surplus steam is available for power production.

A third option, in which also the absorption process can be stopped, leads to further reduction in auxiliary power consumption. This reduction in power consumption can be significantly smaller than the savings achieved in the first two options.

There can be different ways to realize part load operation of components. For example, the mass flow of the $CO_2$ compression unit can be reduced by control means such as inlet guide vanes. In case of a compression unit including two or more parallel compressor trains, the shut down of at least one compressor can also lead to a reduction of the $CO_2$ compression unit's power consumption. In case of two parallel compressor trains operating at full capacity, shut down of one compressor train can lead to a reduction in power consumption by 50% but also imply that 50% of the captured $CO_2$ cannot be compressed and would typically be bypassed to the stack. Alternatively the resorption rate can be reduced. This can, for example, be realized by reducing the flow of absorbent through the regeneration unit and bypassing the remaining flow and mixing the two flows before they enter the absorption unit. As only part of the flow passes through the regeneration unit, the steam required for regeneration can be reduced and the surplus steam can be used for power production. As a consequence of mixing regenerated with unregenerated absorbent, the capacity of the resulting mixture to absorb $CO_2$ can be reduced and a lower percentage of $CO_2$ can be captured from the flue gases and less $CO_2$ is released for compression in the regeneration unit. As it is not very economical to first capture $CO_2$ and then bypass it, a simultaneous reduction in the capacity of all capture systems components is proposed.

Operation of the absorption process itself does not make any sense without further measures, as the absorbent in known arrangements will be saturated quickly and cannot capture any more $CO_2$.

A further exemplary embodiment of the disclosure can increase the flexibility of the plant and $CO_2$ capture and compression method with reduced or no impact on the $CO_2$ release. In order to allow further $CO_2$ capture without regeneration and $CO_2$ compression, the operation of the capture process with storage of the absorbent is proposed.

In this exemplary operating mode the $CO_2$ can be captured by the absorbent, which can be taken from an absorbent storage tank and not regenerated but recirculated to the absorbent tank or stored in a tank for saturated absorbent.

As a consequence not only a sufficiently sized storage tank is required but also a regeneration unit, which has an increased capacity is proposed. The regeneration unit will typically be sized to regenerate absorbent flows from the plant operation plus additional capacity to regenerate saturated absorbent, which was stored during peak power demand. The size of regeneration units depends on the expected operating profile. For example, if high power demand is expected during 1 hour in a given 24 hours operating period close to 5% over capacity can be required to regenerate all saturated absorbent during the period of low power demand. An overcapacity of the regeneration unit might not be required in case the operating profile of the plant foresees extended part load operation of the plant, during which the stored absorbent can be regenerated.

Power optimized operation and overcapacity in regeneration units can allow an efficiency optimized plant operation. The plant efficiency can be highest during operation close to base load. Except for time periods of peak power demand, plants operate at part load during periods of low demand and can consequently be forced to operate at reduced efficiency. The disclosed exemplary operating methods, can take advantage of the additional flexibility in power output to the grid by varying the power consumption of the exemplary $CO_2$ capture system to allow the plant to be operated at its optimum. This flexibility can further be increased with oversized regeneration units as it allows the plant operator to increase the gross output and to use the excess energy for absorbent regeneration and therefore also increase the plant efficiency during periods of low grid power demand.

A further benefit of varying the power consumption of the exemplary $CO_2$ capture system to meet changes in the grid demand can be the possibility to run the power plant at constant load and therefore avoid load variations in the gross output and the consequential thermal stresses and wear and tear.

One exemplary embodiment of the operation, with $CO_2$ capture and compression off, is the demonstration of so-called power reserve. A power reserve is additional power beyond the normal base load power, which can be delivered if requested. For many power grids it is beneficial if the plant can demonstrate a power reserve, which can be called upon in case of a sudden rise in demand or in case that other plants have to reduce their output or even be shut down for an unplanned outage. The ability to demonstrate a power reserve can be commercially valuable. Depending on the grid some plants might be required to operate at part load, for example 90% load in order to keep a power reserve. Operation at 90% can lead to reduced efficiency and can increase the capital and operational cost per MWh produced.

For some grids the possibility to deliver peak power can also be sold as so called spinning reserve. Any back-up energy production capacity, which can be made available to a transmission system within ten minutes' notice and can operate continuously for at least two hours once it is brought online, can be considered as spinning reserve.

A further subject of this disclosure is a thermal power plant for the combustion of carbon-based fuels with a $CO_2$ capture system designed for the operation according to the described flexible operating method.

One exemplary embodiment of the disclosure is a power plant burning a carbon-based fuel, which has at least one flue gas stream. A plant in accordance with the disclosure can include, in addition to components for power generation, a $CO_2$ capture unit for removing $CO_2$ from the flue gas stream, and a compression unit. The capture unit can include capture equipment, in which the $CO_2$ can be removed from the flue gas, a regeneration unit, in which the $CO_2$ can be released from the absorbent, adsorbent or other means to bind the $CO_2$ from the flue gas, and a treatment system for conditioning the $CO_2$ for transportation. The compression unit can include at least one compressor for $CO_2$ compression. The compression unit can also include at least one cooler or heat exchanger for re-cooling compressed $CO_2$ during and/or after the compression.

To allow operation according to an exemplary operating method, a steam turbine of the plant can be designed to convert the maximum steam flow into energy, which can be produced by the plant with the exemplary $CO_2$ capture system switched off.

In a further exemplary embodiment, the generator and electrical systems can be designed to convert the maximum power, which can be produced with the exemplary $CO_2$ capture system off, into electrical power and to transmit this electric power to the grid.

In order to facilitate the above described operation of such an exemplary plant, it can further include a bypass of the $CO_2$ compressor, which can safely vent the $CO_2$, and for example, leads into the flue gas stack downstream of the $CO_2$ capture device.

In an exemplary embodiment, the $CO_2$ capture unit can be designed to withstand the flue gases even when it is not in operation, for example an absorption tower, which is designed to run dry.

Alternatively a bypass of the $CO_2$ capture unit can be foreseen, which allows operation of the power plant independent of the $CO_2$ capture unit. This bypass can also be advantageous for start-up or shut down of the plant as well as for plant operation during maintenance of the exemplary $CO_2$ capture system.

In a further exemplary embodiment, a storage tank dimensioned to supply $CO_2$ absorbent for a defined period of time can be provided and the regeneration unit can have a capacity, which is larger than the capacity required for continuous operation at design of the power plant in order to have extra capacity to regenerate stored absorbent during times of low power demand. Depending on the required size of the storage tank and capacity of the regeneration unit, this exemplary embodiment can lead to significant additional costs.

Different control methods of the exemplary $CO_2$ capture system can be possible. One example is an open loop control of the different components of the exemplary $CO_2$ capture system. This can be suitable in the case that only on/off control of the different components is used.

Open loop control can also be used for a more sophisticated operating process in which a continuous control of the power consumption of the exemplary $CO_2$ capture system, i.e. without sudden steps in the power output due to on/off switching of different components, can be realized. In an exemplary embodiment, continuous control of the power consumption of the exemplary $CO_2$ capture system can be realized by the variation of one component's power consumption at a time, while the remaining components operate at constant load. However, closed loop control can be advantageous for example for transient operation or operation under changing boundary conditions.

In case that operation at reduced capacity of the different components is foreseen, a closed loop control will allow better optimization of the load distribution. This can be especially advantageous if a control of the $CO_2$ capture rate is implemented. In this case the power consumption of the exemplary $CO_2$ capture system is not varied by the control of one single component at a time, while the remaining components operate at constant load. The reduction in capacity of the different components has to be coordinated. For this, a feed back of the current operating conditions of each component can be advantageous and a closed loop control is useful.

A $CO_2$ capture system can be a complex system and an appropriate control system is required as discussed for the different exemplary operating methods above. This exemplary control system depends on and affects the power control of the plant. As the power control can be an essential part of the plant control system, exemplary embodiments integrate the control of the exemplary $CO_2$ capture system into a plant control system and/or coordinate the control of the exemplary $CO_2$ capture system by the plant control system and connect all the relevant data lines to the plant control system. If the plant includes several units and the plant control system has a hierarchical structure including a plant controller and unit master controllers, such an integration or coordination of the exemplary $CO_2$ capture system's control can be within each units' master controller.

Alternatively the exemplary $CO_2$ capture system can have its own controller, which can be connected to the plant control system via a direct data link. The plant control system or the unit master controller has to send at least one signal to the controller of the $CO_2$ capture plant. This signal can, for example, be a commanded power consumption signal or a commanded capture rate.

In the above-described cases, the $CO_2$ capture controller is not necessarily one hardware device but can be decentralized into drive and group controllers coordinated by one or more control units.

In case the control of the $CO_2$ capture system is coordinated by the plant control system, the high-level control unit can, for example, send the total commanded mass flow to the $CO_2$ compression unit's group controller and receive the total actual mass flow as input from this group controller. The compression unit in this example can contain several compressor trains. Each of the compressor trains can have its own device controller. The group controller can have an algorithm to decide how to best distribute the commanded total $CO_2$ compression mass flow on the different compressor trains and sends a commanded mass flow to each individual compressor train's device controller. In return, the group controller can get the actual $CO_2$ compression mass flow of each compressor train. Each compressor train device controller can again work with depended controllers on lower levels.

The same kind of hierarchy can be applied to the control of all components of the exemplary $CO_2$ capture system.

Referring to FIG. 1, an exemplary power plant for execution of an exemplary method can include a known power plant 1 plus a $CO_2$ capture unit 2 and a $CO_2$ compression unit 9.

In FIG. 1 an electrical grid's power demand $P_d$ is shown over time T. An exemplary operation method for intermittent $CO_2$ capture is shown over time T in FIG. 1. The $CO_2$ capture system can run during times II when the power demand $P_d$ is lower than the limit for $CO_2$ capture $L_{CO2}$ and it is switched off during times I of high power when the power demand $P_d$ is higher than the limit for $CO_2$ capture $L_{CO2}$.

Figure 2:
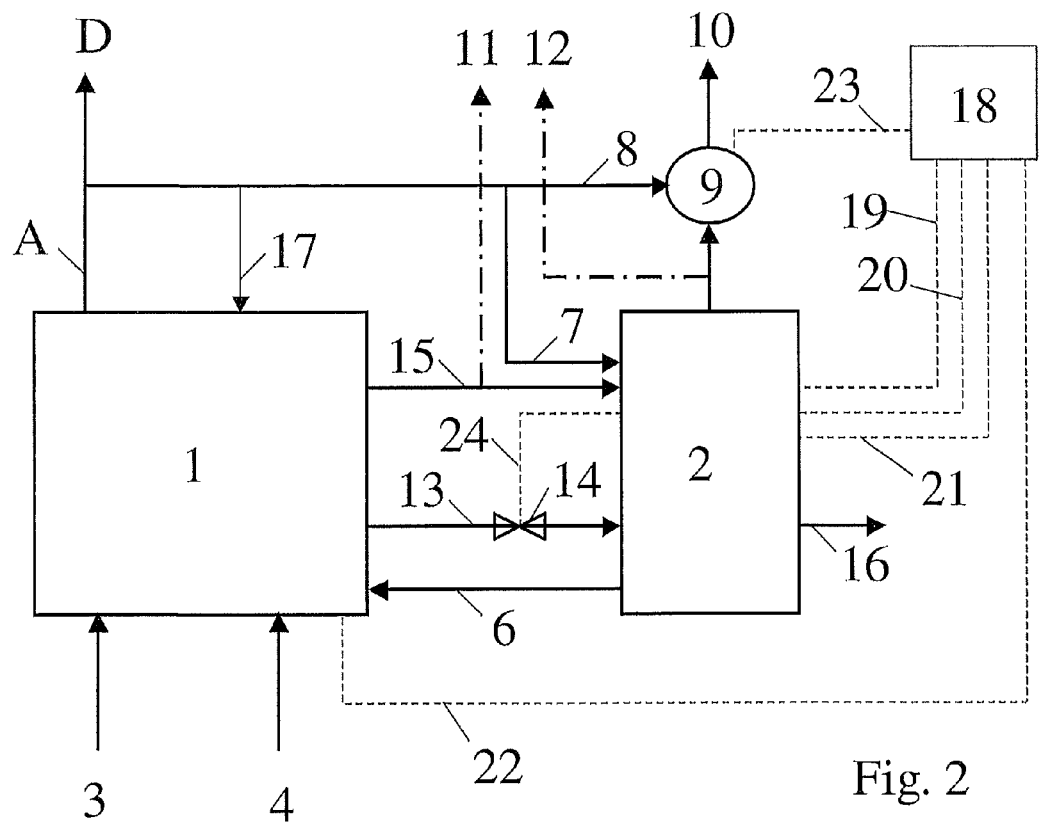
FIG. 2 is a schematic view of an exemplary embodiment of a power plant with $CO_2$ capture.

An exemplary arrangement with post combustion capture is shown in FIG. 2. The power plant 1 is supplied with air 3 and fuel 4. Its main outputs are the plant gross electric power A and flue gas 15. Further, steam can be extracted from the plant 1 and supplied via the steam line 13 and the steam control valve 14 to the $CO_2$ capture unit 2. The steam can be returned to the plant 1 at reduced temperature or as condensate via the return line 6 where it can be reintroduced into the steam cycle. A $CO_2$ capture unit 2 can include a $CO_2$ absorption unit, in which $CO_2$ can be removed from the flue gas by an absorbent, and a regeneration unit, in which the $CO_2$ can be released from the absorbent. Depending on the temperature of the flue gas and the operating temperature range of the $CO_2$ absorption unit, a flue gas cooler can also be utilized.

The $CO_2$ depleted flue gas 16 can be released from the $CO_2$ capture unit to a stack. In case the $CO_2$ capture unit 2 is not operating, it can be bypassed via the flue gas bypass 11.

In operation, the captured $CO_2$ will be compressed in the $CO_2$ compressor 9 and the compressed $CO_2$ 10 will be forwarded for storage or further treatment.

Electric power 7 can drive auxiliaries of the $CO_2$ capture unit 2 and electric power 8 can be used to drive the $CO_2$ compressor 9. The net power output to the grid D is therefore the gross plant output A reduced by the electric power for plant auxiliaries 17, reduced by the electric power for $CO_2$ compression unit 8, and by the electric power for the $CO_2$ capture unit 7.

The corresponding control system 18, which can integrate the control of the additional components needed for the $CO_2$ capture and compression with the control of the power plant is also depicted in FIG. 2. The control system has at least one control signal 22 line with the power plant 1, and at least one control signal line with the $CO_2$ compression unit 9. Further, at least one control signal line 19 with the $CO_2$ capture unit 2 including the flue gas bypass 11 is indicated. In case the capture unit 2 is based on absorption or adsorption a regeneration unit can be part of the system and correspondingly at least one signal line 20 to the regeneration unit can be provided. If the capture unit 2 also includes at least one storage tank for an adsorbent/absorbent, control signal lines 21 to the storage system can be provided. For the example shown, in which steam 13 is used for regeneration, the steam control valve 24 can be controlled via the control signal lines 24. This control line can be connected to the resorption unit, which is part of the capture unit 2, or directly to the control system 18.

The continuous control of net power output D is explained using two examples in which an increase in net power output D is required starting from an operating point where all components operate at full capacity.

In an exemplary approach the net output can first be increased by a controlled reduction in the power consumption of the $CO_2$ compressor unit 9. As the power consumption of the compressor unit 9 is reduced, the amount of $CO_2$ released from the $CO_2$ regeneration unit 2 stays constant. As a consequence part of the $CO_2$ flow has to bypass the $CO_2$ compressor unit 9 through the $CO_2$ compression unit bypass 12. Once the $CO_2$ compressor unit 9 is completely switched off, the net output can be increased by a controlled reduction in the power consumption of the $CO_2$ regeneration unit. Finally, when the $CO_2$ regeneration unit is completely switched off, the net output can be increased by a controlled reduction in the power consumption of the $CO_2$ absorption unit and, if applicable, of a flue gas cooler. In case the $CO_2$ absorption unit 2 is not designed to run dry, i.e., it cannot be exposed to the flue gases 15 without the flow of absorbent and/or additional flue gas cooling, the flue gas bypass 11 for the $CO_2$ capture unit 2 can be opened as a function of the power available for the absorption unit.

In an exemplary approach, the net output can be increased by a controlled coordinated reduction in the power consumption of all components of the $CO_2$ capture unit 2 and compression unit 9. The target is to maximize the $CO_2$ capture rate at reduced power consumption. To this end the capacity of all components can be reduced simultaneously at the same rate and the $CO_2$ flow through all components can be the same. In consequence the power consumption can be varied as a function of the capture rate. To assure that the flow rates of different components match, a feedback from these components is required and a closed loop control can be advantageous. At a low capture rate, and if the $CO_2$ absorption unit 2 is not designed to run dry, e.g. it cannot be exposed to the flue gases without the flow of absorbent and/or additional flue gas cooling, the flue gas bypass for the $CO_2$ capture unit 11 can be opened as a function of the power available for the absorption unit 2.

Figure 3:
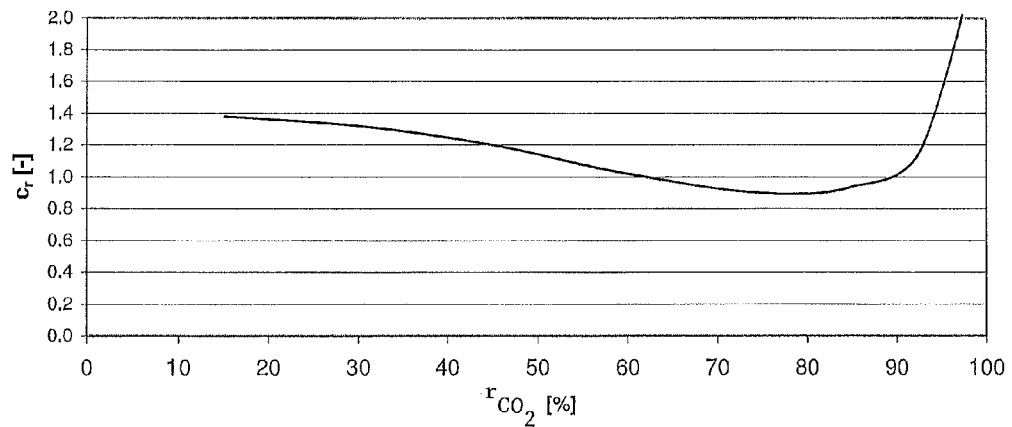
FIG. 3 schematically shows the relative cost $c_r$ of ton of $CO_2$ avoided as function of capture rate $r_{CO2}$.

The expected normalized cost $c_r$ per ton of captured $CO_2$ is shown in FIG. 3 as a function of $CO_2$ capture rate $r_{CO2}$. The cost per ton of captured $CO_2$ is normalized with the cost at 90% capture rate $r_{CO2}$. It is obvious that a capture rate above 90% becomes expensive and that a plant should be designed for a 80 to 90% capture rate. At lower than 80% capture rates the cost per captured ton of $CO_2$ increases slightly. A decrease in capture rate with a plant designed for 90% capture rate can be realized without significant penalty in cost per $CO_2$ captured. If the capture rate is reduced during operation, a significant amount of power can be saved and therefore fed to the grid if required.

The impacts of the main power consumers of the $CO_2$ capture system on the normalized plant power $P_r$ output is shown in FIG. 4. The impact of the auxiliary power consumption of the plant itself is also indicated in this Figure.

FIG. 4 further shows an exemplary optimized operation method of a power plant with $CO_2$ capture and compression over time T. The impact of the plant auxiliaries and main power consumers of the $CO_2$ capture system on the net plant power output D is shown by indicating the relative output $P_r$ at different stages of the plant. All power outputs shown in this Figure are normalized by plant gross power output A at base load with steam extraction for resorption. A' is the gross output without steam extraction for resorption. B is the gross output reduced by the plant auxiliaries B. C is the output after the output B is further reduced by $CO_2$ compression. D is the resulting plant net power output after D is reduced by the power consumption of the absorption. According to an exemplary operating method, the power reductions from B to C, C to D as well as the gross power increase from A to A' are variable and used to control the net output D. D can be controlled to meet the power requirements $P_D$ of the electric grid. For maximum net output X, all consumers of the $CO_2$ capture system can be switched off and no steam is extracted for resorption.

In the given example, the required variations in net power output during the day are met by controlling the power consumption of the different consumers of the $CO_2$ capture system. As a result, the heat input and thermal load of the plant can be kept constant during the day, in this example from 7:00 hours to 22:00 hours. Only during the night, when the net output is reduced to 50% of the maximum net output delivered during the mid day peak, the gross output is reduced to about 62% of the base load net output.

In this example variations of net output in the order of 15% can be met by control of the power consumption of $CO_2$ capture and compression. This can be seen for example between the morning operation at 11:00 hours and the peak demand at 12:30 hours.

The gross power has to be reduced only to 62% in order to achieve a 50% drop in net power output. The changes in heat input and thermal load can be smaller as the efficiency typically drops at part load. This can be true for a gas turbine or a combined cycle power plant. Therefore even if a change in thermal load is required to meet large changes in the required net power output D, the relative change in thermal load can be reduced compared to known operating methods.

Depending on the operating regime, constant gross power can be kept as long as the plant is operating.

For example, the power used for recompression of flue gasses, as used in case of cryogenic $CO_2$ separation or in case of absorption on elevated pressure levels can be saved or reduced during times of high power demand. Or, in case of $CO_2$ separation with chilled ammonia, the cooling power can be saved or reduced during times of high power demand. Further, the exemplary methods and a corresponding plant without $CO_2$ compression can be utilized. In an exemplary embodiment a storage tank for cooling medium can be provided, which is used for chilling during periods of high power demand. Further, analogous to the over sizing of regeneration units described above, the chilling equipment can be oversized to have capacity to cool down stored cooling medium during periods of low power demand.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Power Plant
2 $CO_2$ capture unit
3 Air
4 Fuel
6 return line
7 Electric power for $CO_2$ capture unit
8 Electric power for $CO_2$ compression unit
9 $CO_2$ compression
10 Compressed $CO_2$
11 Flue gas bypass for $CO_2$ capture unit
12 $CO_2$ compression unit bypass
13 Steam to $CO_2$ capture unit
14 Steam control valve
15 Flue gas to $CO_2$ capture unit
16 $CO_2$ depleted flue gas
17 Electric power for plant auxiliary excluding $CO_2$ capture and compression
18 Control system
19 Control signal exchange with $CO_2$ capture unit and flue gas bypass 20 Control signal exchange with regeneration unit (if applicable)
21 Control signal exchange with absorbent/adsorbent storage system (if applicable)
22 Plant control signals exchange as for conventional plant without $CO_2$ capture including gross and net power
23 Control signal exchange with $CO_2$ compression unit and compressor bypass
24 Control signal exchange to steam control valve—directly from control system or via the regeneration unit (if applicable)
I times of high power demand with $CO_2$ capture off
II times of low power demand with $CO_2$ capture on
A Plant gross power output with steam extraction for $CO_2$ resorption
A' Plant gross power output without steam extraction for $CO_2$ resorption
B A reduced by plant auxiliaries without $CO_2$ capture and compression
C B reduced by power requirements for $CO_2$ compression—varied depending on grid power demand.
$c_r$ relative cost of $CO_2$ capture
D $CO_2$ capture plant net power output (C reduced by power requirements for absorption—varied depending on grid power demand).
$P_d$ power demand of the electric grid
$P_r$ Power output relative to the plant's base load gross power
$r_{CO2}$ $CO_2$ capture rate
T Time
X Time of peak net power output with $CO_2$ capture and compression off

What is claimed is:

1. A method for operating a power plant, the method comprising:
    operating the plant via a control system and $CO_2$ capture system;
    using a power consumption of the $CO_2$ capture stem as a control parameter for controlling net power output of the plant; and
    controlling the $CO_2$ capture system by a closed loop control system, which is integrated into the control system or coordinated by the control system or has a direct data link to the plant control system.

2. A method for operating a power plant, the method comprising:
    operating the plant via a control system and $CO_2$ capture system;
    using a power consumption of the $CO_2$ capture system as a control parameter for controlling net power output of the plant;
    operating the $CO_2$ capture system at reduced capacity or shutting down the $CO_2$ capture system in order to supply additional power to the grid; and
    using this additional power to increase rated plant capacity.

3. A method for operating a power plant, the method comprising:
    operating the plant via a control system and $CO_2$ capture system; and
    using a power consumption of the $CO_2$ capture system as a control parameter for controlling net power output of the plant
    operating the power plant close to or at design point when the $CO_2$ capture system is in operation; and
    using the power consumption of the $CO_2$ capture system as capacity reserve.

4. A method for operating a power plant, the method comprising:
    operating the plant via a control system and $CO_2$ capture system;
    using a power consumption of the $CO_2$ capture system as a control parameter for controlling net power output of the plant;
    controlling the plant to maintain thermal load of the plant constant; and
    control the power consumption of the $CO_2$ capture system to vary the net power output to a grid.

5. A method for operating a power plant, the method comprising:
    operating the plant via a control system and $CO_2$ capture system;
    using a power consumption of the $CO_2$ capture s stem as a control parameter for controlling net power output of the plant; and
    varying a $CO_2$ capture rate to control the power consumption of the $CO_2$ capture system.

6. A method for operating a power plant, the method comprising:
    operating the plant via a control system and $CO_2$ capture system wherein the $CO_2$ capture system comprises a $CO_2$ compressor unit;
    using a power consumption of the $CO_2$ capture system as a control parameter for controlling net power output of the plant; and
    shutting down the $CO_2$ compression unit or operating the $CO_2$ compression unit at reduced capacity.

7. A method according to claim 6, comprising:
    releasing a part of or all captured $CO_2$ via a bypass of the $CO_2$ compression unit.

8. A method for operating a power plant, the method comprising:
    operating the plant via a control system and $CO_2$ capture system, wherein the $CO_2$ capture system comprises a regeneration unit;
    using a power consumption of the $CO_2$ capture system as a control parameter for controlling net power output of the plant; and
    shutting down the regeneration unit or operating the regeneration unit at reduced capacity.

9. A method for operating a power plant, the method comprising:
    Operating the plant via a control system and CO2 capture system, wherein the CO2 capture system comprises an absorption unit or adsorption;
    using a power consumption of the CO2 capture system as a control parameter for controlling net power output of the plant; and
    shutting down the absorption or adsorption unit or operating the absorption or adsorption unit at reduced capacity.

10. A method according to claim 9, comprising bypassing a part of or all flue gas around the $CO_2$ capture system.

11. A method according to claim 8, wherein regeneration takes place at reduced capacity at times of high power demand, and wherein a stored absorbent or adsorbent is used for $CO_2$ capture during this time.

12. A method according to claim 11, comprising:
    reducing a steam consumption of the regeneration unit comprised in the capture system due to the shut down or operation at reduced capacity; and
    feeding surplus steam to at least one steam turbine of the plant.

13. A method according to claim 11, wherein regeneration of the absorbent or adsorbent takes place at times of low power demand.

14. A power plant, comprising:
- a $CO_2$ capture system including a $CO_2$ compression unit; and
- a control system configured to receive power consumption of the $CO_2$ capture system as a control parameter and to control net power output of the plant based on the received control parameter,
- wherein the control system is configured to at least one of shut down the $CO_2$ compression unit and operate the $CO_2$ compression unit at a reduced capacity to vary a $CO_2$ capture rate to control power consumption of the $CO_2$ capture system.

15. A power plant according to claim 14, comprising:
- at least one steam turbine for converting a maximum steam flow into energy, which can be produced by the plant with the $CO_2$ capture system switched off.

16. A power plant according to claim 14, comprising:
- at least one generator and electrical systems for converting a maximum power, which is produced with the $CO_2$ capture system off, into electrical power and to transmit this electric power to the grid.

17. A power plant according to claim 14, wherein the $CO_2$ capture system includes an absorption unit having a bypass.

18. A power plant according to claim 14, wherein the absorption unit comprised in the capture system is designed to withstand flue gases even when not in operation.

19. A power plant according to claim 14, wherein the $CO_2$ capture system includes a regeneration unit and a storage tank for an absorbent or an adsorbent, which allows capture of $CO_2$ even when the regeneration unit in the capture system is operating at reduced capacity or is off.

20. A power plant according to claim 19, wherein the regeneration unit in the capture system has a capacity, which is larger than is required for steady state operation of the power plant in order to have additional capacity to regenerate stored absorbent or adsorbent.

21. A power plant according to claim 14, comprising:
- chilled ammonia for the CO2 capture system; and
- a storage tank for cooling medium that includes chilled ammonia, which is used for chilling during periods of high power demand, wherein the storage tank is oversized to have capacity to cool down stored cooling medium during periods of low power demand.

* * * * *